(12) United States Patent
Onuki

(10) Patent No.: US 6,392,696 B1
(45) Date of Patent: *May 21, 2002

(54) IMAGE BLUR PREVENTION APPARATUS MATCHING SIGNAL CHARACTERISTICS OF A LENS AND CAMERA

(75) Inventor: Ichiro Onuki, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/880,537

(22) Filed: Jun. 23, 1997

Related U.S. Application Data

(63) Continuation of application No. 08/363,326, filed on Dec. 23, 1994, now abandoned.

(30) Foreign Application Priority Data

Dec. 27, 1993 (JP) ............................................. 5-331098

(51) Int. Cl.[7] .............................................. H04N 5/228
(52) U.S. Cl. .............................. 348/208; 396/53; 396/55
(58) Field of Search ............................ 348/208; 396/53, 396/55, 354

(56) References Cited

U.S. PATENT DOCUMENTS

| | | | | |
|---|---|---|---|---|
| 4,965,619 A | | 10/1990 | Shikaumi et al. ............. 354/410 |
| 5,192,964 A | * | 3/1993 | Shinohara et al. ............ 348/208 |
| 5,335,032 A | * | 8/1994 | Onuki et al. ................. 348/208 |
| 5,376,993 A | * | 12/1994 | Kubota et al. ................ 348/208 |
| 5,479,236 A | * | 12/1995 | Tanaka ......................... 348/208 |
| 5,485,208 A | * | 1/1996 | Mabuchi et al. .............. 348/335 |
| 5,537,185 A | * | 7/1996 | Ohishi et al. ................. 354/472 |
| 5,617,177 A | * | 4/1997 | Imafuji et al. ................. 396/53 |

FOREIGN PATENT DOCUMENTS

| | | | |
|---|---|---|---|
| JP | 3-192227 | 8/1991 | |
| JP | 3-248136 | 11/1991 | ........... G03B/17/00 |

* cited by examiner

*Primary Examiner*—Andrew B. Christensen
*Assistant Examiner*—Jacqueline Wilson
(74) *Attorney, Agent, or Firm*—Fitzpatrick, Cella, Harper & Scinto

(57) ABSTRACT

Image blur prevention apparatus matching signal characteristics of a lens and a camera includes a vibration detecting sensor disposed in the camera for detecting vibration of the camera and providing a vibration signal corresponding thereto. An image blur prevention control circuit is disposed in the lens and controls an image blur prevention operation in accordance with the vibration signal output from the vibration detecting sensor. A determination device determines the relationship between the signal characteristic of the vibration signal and a control characteristic of the image blur prevention control circuit. For example, if the camera contains either an acceleration sensor or a velocity sensor, the output signal will be appropriately converted so that the image blur prevention control circuit can control the image blur prevention operation appropriately.

11 Claims, 17 Drawing Sheets

FIG. 7

| CAMERA \ LENS | LNS 1 LENS ID = 1 | LNS 2 LENS ID = 2 |
|---|---|---|
| CMR 1 CAMERA ID = 1 | NOT CONVERTED | $\theta \to \omega$ (DIFFERENTIAL) |
| CMR 2 CAMERA ID = 2 | $\omega \to \theta$ (INTEGRAL) | NOT CONVERTED |

FIG. 14

| CAMERA \ LENS | LNS 3 LENS ID = 3 | LNS 4 LENS ID = 4 |
|---|---|---|
| CMR 3 CAMERA ID = 3 | NOT CONVERTED | $\theta \to \omega$ (DIFFERENTIAL) |
| CMR 4 CAMERA ID = 4 | $\omega \to \theta$ (INTEGRAL) | NOT CONVERTED |

IMAGE BLUR PREVENTION APPARATUS MATCHING SIGNAL CHARACTERISTICS OF A LENS AND CAMERA

This application is a continuation of application Ser. No. 08/363,326 filed Dec. 23, 1994, now abandoned.

BACKGROUND OF THE INVENTION

1. Field of the Invention

The present invention relates to a control apparatus used for an image blur prevention apparatus for preventing an image blur caused by, e.g., a hand vibration.

2. Related Background Art

Conventionally, various kinds of photographing equipments, each consisting of a camera body having image pickup means and an exchangeable lens detachable from the body, i.e., single-lens reflex camera systems, which are assembled with an image blur correction mechanism, have been proposed.

For example, U.S. Pat. No. 4,965,619 filed by the assignee of the present application has made a proposal in which blur (vibration) detection means and image blur correction means are arranged in an exchangeable lens, and the start and end of an image blur correction operation are controlled in response to an operation of an operation member at the camera side.

On the other hand, Japanese Laid-Open Patent Application No. 3-192227 has made a proposal in which the image blur speed is detected by a two dimensional photosensitive sensor in a camera body, the detected blur speed is converted into a driving speed control value of a blur (vibration) correction lens, and the converted control value is transmitted to an exchangeable lens to control the driving operation of the blur correction lens, thereby suppressing an image blur.

Since a single-lens reflex camera is a product which has an importance as a system, it is desirable to arrange an element with a high value added or high cost in the camera side. From this viewpoint, a high-value added and high-cost element such as a blur detection sensor is preferably arranged in the camera side. On the other hand, since the image blur correction lens is arranged in the exchangeable lens, a control circuit of the lens is preferably arranged in the exchangeable lens. For this reason, in U.S. Pat. No. 4,965,619, since the exchangeable lens has a blur detection sensor, such a camera has poor expandability as a system, and the exchangeable lens becomes considerably expensive since it has both a blur correction optical mechanism and a blur detection sensor.

On the other hand, in Japanese Laid-Open Patent Application No. 3-192227, since the blur detection sensor is arranged in the camera body, such a camera fulfills the product concept of a single-lens reflex camera system, i.e., the arrangement of a high-value added element in the camera side. However, in this prior art, since the attribute of a signal between the camera and lens is fixed to be the blur speed, system expandability is poor. More specifically, upon development of a new camera body or exchangeable lens, it is a general practice to use best ones, at the time of development, of blur detection sensors and blur correction mechanisms to be arranged in them. However, for example, as a blur detection sensor, various kinds of sensors are available as follows:

Angular accelerometer: which detects the angular acceleration of a blur (vibration) by utilizing a servo effect between a mass member and a torquer coil.

Angular velocimeter: which detects the angular velocity of a blur by a vibration gyro, a gas-rate gyro, or a laser gyro.

Angular displacement meter: which detects the angular displacement of a blur by utilizing the inertia of a fluid in a cylindrical chamber.

Image blur displacement meter: which detects the displacement of an image by an image sensor.

Image blur velocimeter: which detects the motion vector (velocity) of an image by an image sensor.

Also, these sensors output signals having different attributes, i.e., an (angular) accelerations (angular) velocity, and (angular) displacement.

On the other hand, as driving control methods of a blur correction lens, the following methods are available:

a method using the displacement of a lens as a control object (reference value); and a method using the velocity of a lens as a control object (reference value).

In this case, the control system is controlled based on the (angular) displacement and velocity of a blur.

For this reason, when the signal exchanged between the camera and lens is fixed to be, e.g., the blur speed, the range of blur sensors and blur correction lens methods which may be used is narrowed. On the other hand, the mount system of a single-lens reflex camera must normally be effective for a long period of time, and the compatibility of the mount systems must be maintained during this period of time. However, Japanese Laid-Open Patent Application No 3-192227 cannot provide a system which can flexibly cope with the pending problems, resulting in poor system expandability.

SUMMARY OF THE INVENTION

One aspect of the invention is an apparatus which is adapted to be used with a signal processing apparatus for use with an image blur prevention apparatus, and which comprises a determination portion for determining the relationship between the signal output characteristic of a signal output apparatus for outputting a signal to be input to the signal processing apparatus, and the signal processing characteristic of the signal processing apparatus, whereby a signal for image blur prevention is appropriately processed.

BRIEF DESCRIPTION OF THE DRAWINGS

FIG. 7 is a table for explaining signal conversion in the camera according to the first embodiment of the present invention;

FIG. 14 is a table for explaining signal conversion in the lens according to the second embodiment of the present invention;

DETAILED DESCRIPTION OF THE PREFERRED EMBODIMENTS

First Embodiment

FIGS. 1 to 7 are views associated with an image blur prevention system according to the first embodiment of the present invention, and the first embodiment will be described below with reference to FIGS. 1 to 7.

Figure 1:
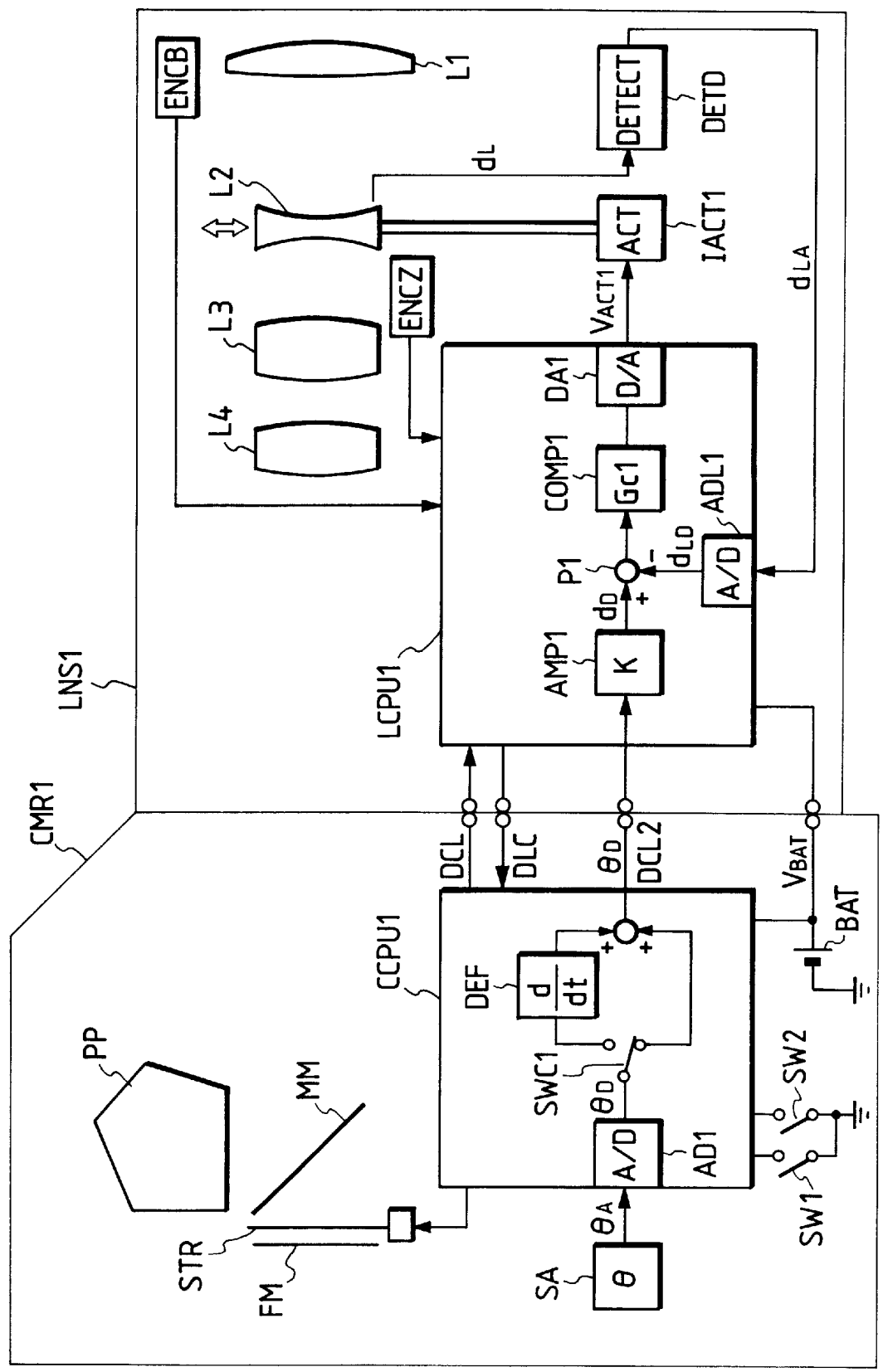
FIG. 1 is a diagram showing a control system of a camera and a lens according to the first embodiment of the present invention.

FIG. 1 shows a single-lens reflex camera system constituted by a first camera body CMR1 and a first exchangeable lens LNS1.

The camera body CMR1 will be explained below.

The camera body CMR1 comprises a main mirror MM, a pentagonal prism PP, a shutter device STR, and a film FM. Also, the camera body CMR1 comprises an angular displacement system SA for detecting the angular displacement of a hand vibration generated in the camera body CMR1, and a camera microcomputer CCPU1 for controlling the exposure sequence and the film wind-up operation of the camera body CMR1 and calculating the angular displacement of the hand vibration.

Switches SW1 and SW2 are respectively turned on at the first and second stroke positions of a release button (not shown), and serve as trigger switches for the start of image blur correction and exposure control.

A power supply BAT supplies a power supply voltage to circuits and actuators in the camera body CMR1 and the lens LNS1.

The exchangeable lens LNS1 will be described below.

The lens LNS1 has an optical system constituted by four lens groups L1 to L4. A zooming operation is achieved by moving the lens groups L1, L2, and L3 in the optical axis direction while maintaining a predetermined relationship therebetween, and a focusing operation is achieved by moving the lens group L1.

Encoders ENCZ and ENCB respectively detect the zoom position and the focus position, and normally comprise detection brushes of gray coded patterns.

The second lens group L2 is an image blur correction lens, and is supported to be movable in two-dimensional directions in a plane perpendicular to the optical axis. The lens group L2 is shift-driven by an actuator IACT1. A displacement detector DETD detects a displacement amount $d_L$ of the blur correction lens.

A lens microcomputer LCPU1 performs image blur correction control.

The camera body CMR1 and the lens LNS1 are electrically connected to each other via three signal lines DCL, DLC, and DCL2 and a power supply line VBAT in an engagement mount portion. The line DCL transmits commands, data, and the like from the camera to the lens, the line DLC transmits command, data, and the like from the lens to the camera, and the line DCL2 transmits a blur signal from the camera to the lens. In addition, a power supply voltage is supplied from the camera to the lens microcomputer LCPU1, the actuator IACT1, and the like in the lens via the line VBAT.

Image blur correction control blocks will be explained below.

The camera body CMR1 has the angular displacement meter (system) SA as a blur detection sensor, and outputs the angular displacement of a hand vibration as an analog signal $\theta_A$. The camera microcomputer CCPU1 converts the data $\theta_A$ into digital data by its internal A/D converter AD1, and outputs a digital value $\theta_D$ of the angular displacement of the hand vibration. A switch SWC1 selects whether the hand vibration signal $\theta_D$ is directly output or is differentiated. In FIG. 1, the lens LNS1 controls the displacement of the image blur correction lens L2, as will be described later, and the camera recognizes this via communications and switches the switch SWC1 to the lower contact. Therefore, a hand vibration angular displacement signal is output onto the line DCL2, and the lens microcomputer LCPU1 receives this signal.

The input signal is multiplied with a coefficient K by an amplifier AMP1. The coefficient K is called image blur prevention sensitivity (unit: [mm/deg]). That is, this coefficient K represents a shift amount (mm) of the image blur correction lens L2 to correct an image blur caused by a hand vibration angular displacement of 1°. Since the coefficient K changes in correspondence with the zooming and focusing states, the lens microcomputer LCPU1 stores the coefficient K as matrix data K(Z, B) in a ROM. The lens microcomputer LCPU1 reads out a stored value K(Z, B) from the ROM on the basis of a zoom zone number Z and a focus zone number B, which are respectively detected by the zoom encoder ENCZ and the focus encoder ENCB. The hand vibration angular displacement $\theta_D$ is then multiplied with the readout coefficient K(Z, B) to obtain a displacement $d_D$ for driving the image blur correction lens.

The displacement $d_D$ is input to a phase compensation element COMP1 for increasing the stability of a feedback loop via an addition point P1, and a signal output from the element COMP1 is converted into an analog signal by a D/A converter DA1, thus outputting a signal $V_{ACT1}$. The signal $V_{ACT1}$ is a control signal for driving the image blur correction actuator IACT1, and the actuator IACT1 controls the displacement of the image blur correction lens L2 in accordance with the signal $V_{ACT1}$.

The displacement detector DETD detects the displacement $d_L$ of the lens L2, and outputs it as an analog signal $d_{LA}$.

The displacement signal $d_{LA}$ is input to the lens microcomputer LCPU1 and is converted into a digital signal $d_{LD}$ by an A/D converter ADL1, and an inverted signal of the signal $d_{LD}$ is input to the addition point P1.

With the above-mentioned arrangement, the feedback loop for controlling the image blur correction lens L2 is constituted, and the lens L2 is accurately controlled in accordance with the command signal $d_D$.

The above-mentioned arrangement will be described in more detail below. The camera body CMR1 outputs a hand vibration angular displacement detected by the angular displacement meter SA to the lens LNS1, and the lens performs displacement control of the image blur correction lens L2 in accordance with the angular displacement, thereby controlling an image blur on the film FM.

Note that the control elements in the microcomputers CCPU1 and LCPU1 are realized by digital arithmetic processing in the microcomputers, except for the A/D and D/A converters.

Figure 2:
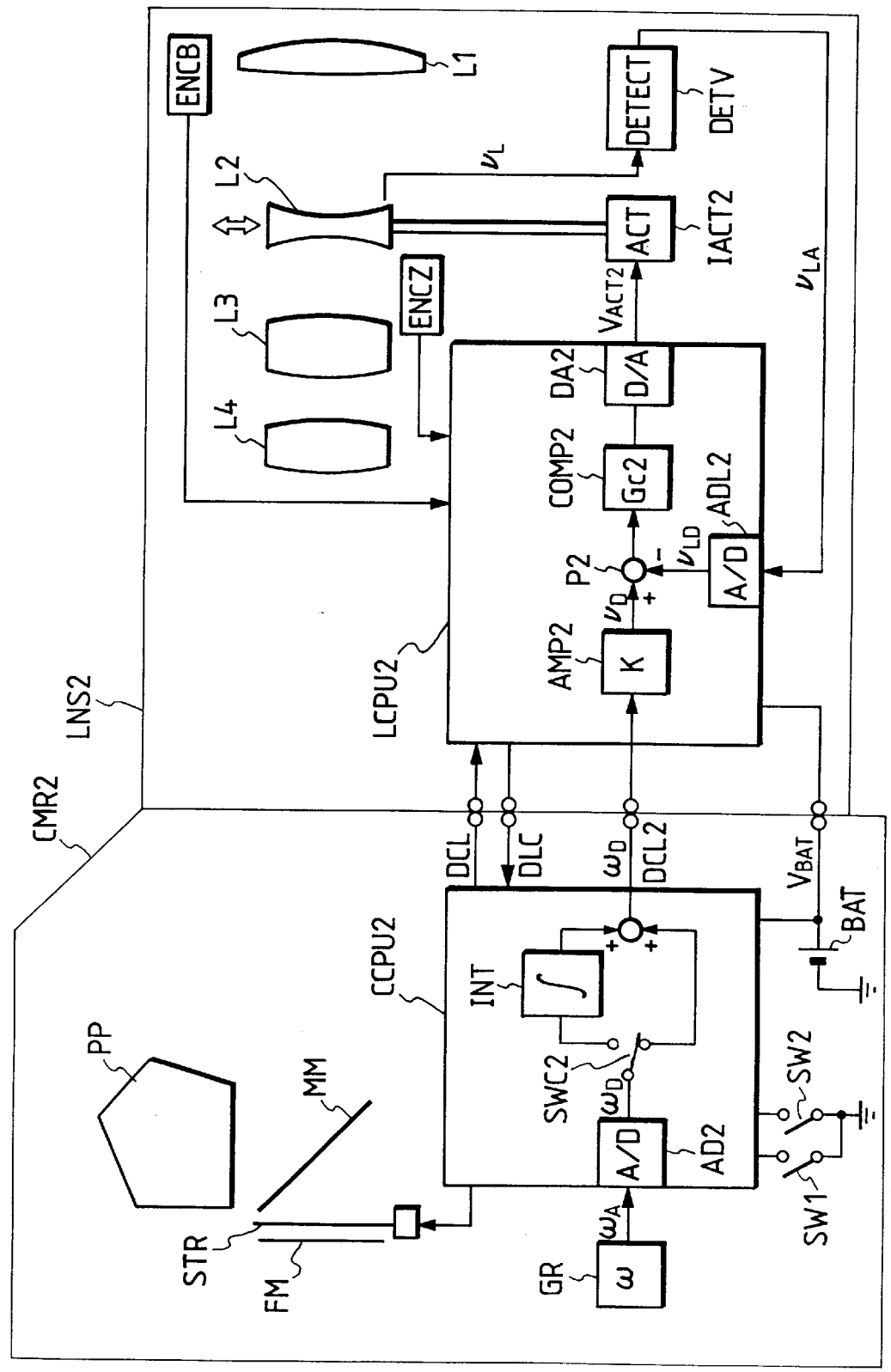
FIG. 2 is a diagram showing a control system of a camera and a lens, which is different from that shown in FIG. 1, according to the first embodiment of the present invention.

FIG. 2 shows a combination of a second camera body CMR2 and a second exchangeable lens LNS2, which are different from those shown in FIG. 1, in the single-lens reflex camera system of the first embodiment.

The camera body CMR2 has an angular velocimeter GR such as a vibration gyro as a vibration detection sensor, and the angular velocimeter GR outputs an angular velocity signal $\omega_A$. A camera microcomputer CCPU2 has a switch SWC2 and an integrator INT.

On the other hand, a microcomputer LCPU2 in the lens LNS2 has an amplifier AMP2, an addition point P2, a phase compensation element COMP2, a D/A converter DA2, and an A/D converter ADL2. The lens LNS2 has an actuator IACT2 for driving an image blur correction optical system L2, and a velocity detector DETV for detecting a moving velocity $v_L$ of the lens L2.

An image blur correction operation in the above-mentioned system will be described below.

The angular velocimeter GR in the camera body CMR2 outputs a hand vibration angular velocity $\omega_A$, and the camera microcomputer CCPU2 converts it into a digital signal $\omega_D$ using an A/D converter AD2. The camera microcomputer CCPU2 recognizes the attribute of the lens via communications with the lens in the flow to be described later, and connects the switch SWC2 to the lower contact. Therefore, the hand vibration angular velocity $\omega_D$ is transmitted to the lens microcomputer LCPU2 without modifications via a line DCL2. The signal $\omega_D$ is multiplied with image blur prevention sensitivity K(Z, B) by the amplifier AMP2 to be converted into a velocity control value $v_D$ of the image blur correction lens. The control value is input to the addition point P2. The input signal is converted into a control signal $V_{ACT2}$ of the actuator IACT2 by the D/A converter DA2 via the phase compensation element COMP2.

The actuator IACT2 controls the velocity of the lens L2 in accordance with the signal $V_{ACT2}$, and the velocity detector DETV. detects the moving velocity $v_L$ of the lens L2 and outputs a velocity signal $v_{LA}$. The signal $v_{LA}$ is converted into a digital signal $v_{LD}$ by the A/D converter ADL2 in the microcomputer LCPU2, and an inverted signal of the signal $v_{LD}$ is input to the addition point P2.

More specifically, in the above-mentioned system, the camera body CMR2 outputs a hand vibration angular velocity detected by the angular velocimeter GR to the lens LNS2, and the lens controls the velocity of the image blur correction lens L2 in accordance with the input angular velocity, thereby suppressing an image blur on the film FM.

Figure 3:
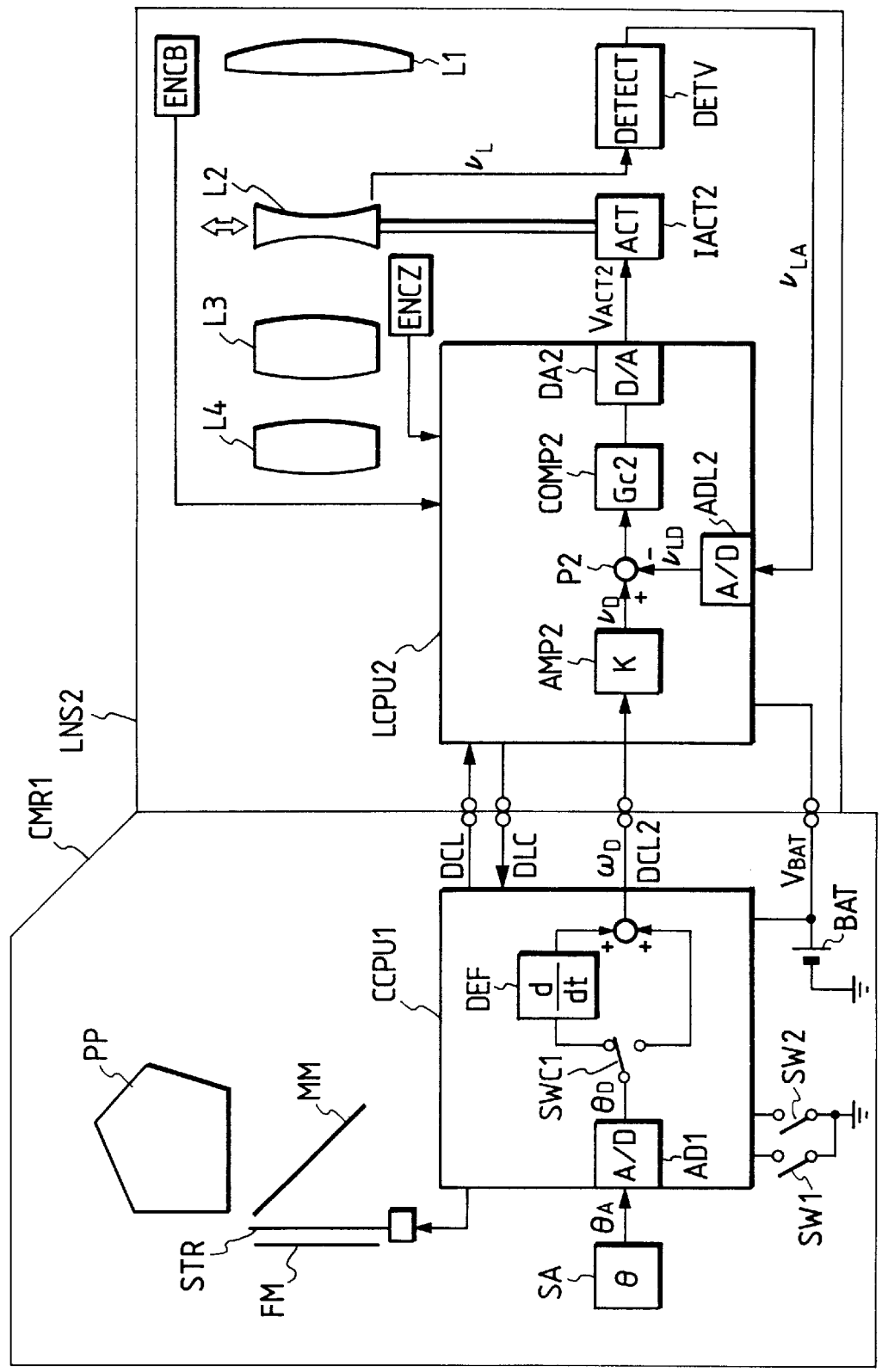
FIG. 3 is a diagram showing a control system of a camera and a lens, which is different from that shown in FIG. 1, according to the first embodiment of the present invention.

FIG. 3 shows a system which combines the first camera body CMR1 in FIG. 1 and the second lens LNS2 in FIG. 2. The blur detection sensor in the camera body CMR1 detects a hand vibration angular displacement, while the lens LNS2 requires a hand vibration angular velocity since it controls the velocity of the image blur correction lens L2. Therefore, the camera microcomputer CCPU1 connects the switch SWC1 to the differentiator DEF side to output an angular velocity $\omega_D$ obtained by differentiating the hand vibration angular displacement $\theta_D$. Upon switching of the switch SWC1, the camera body CMR1 having the angular displacement meter SA can obtain an angular velocity output as in the camera body CMR2 having the angular velocimeter GR, and does not disturb the image blur correction of the lens LNS2.

Figure 4:
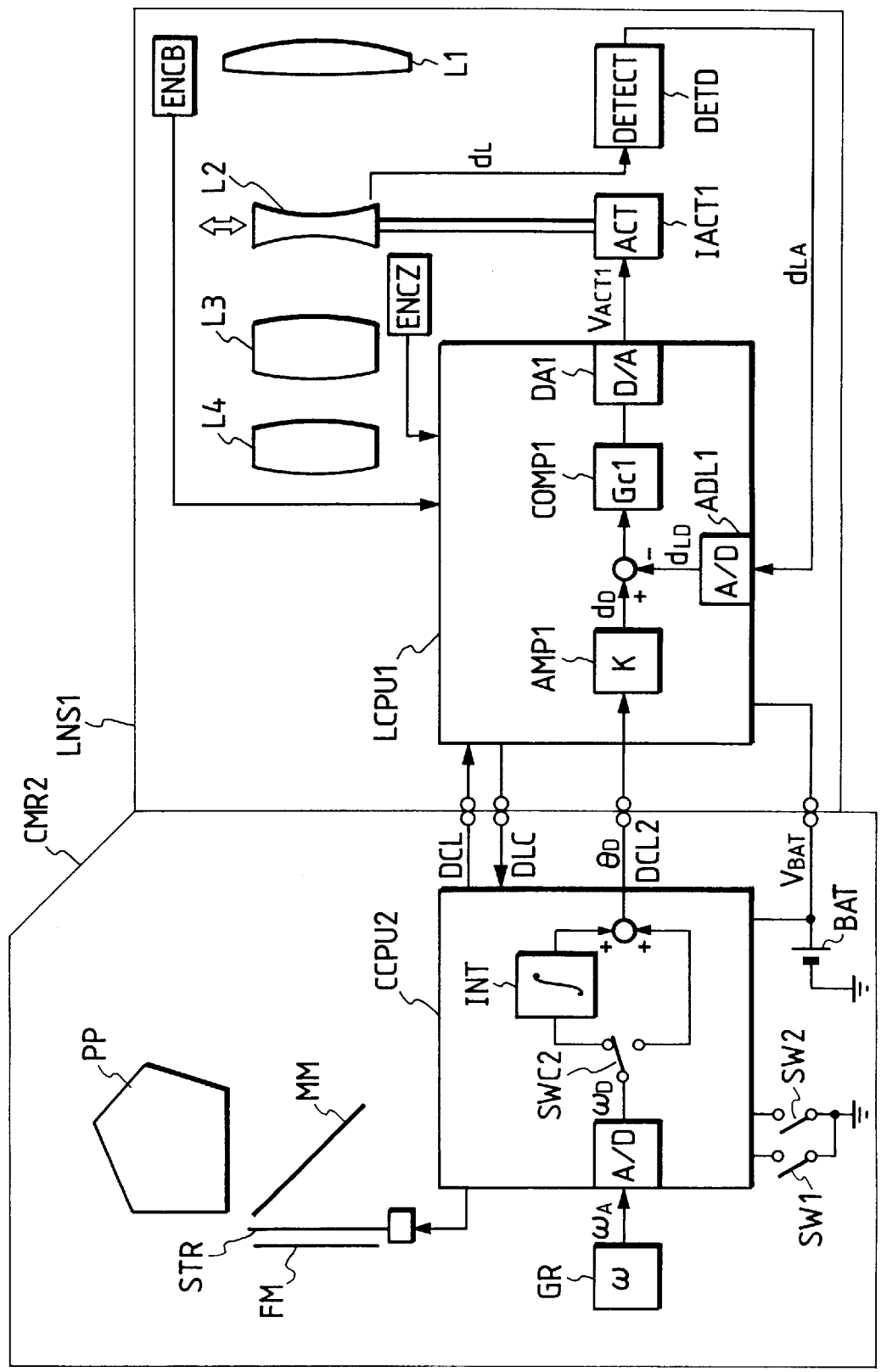
FIG. 4 is a diagram showing a control system of a camera and a lens, which is different from that shown in FIG. 1, according to the first embodiment of the present invention.

FIG. 4 shows a system which combines the second camera body CMR2 in FIG. 2 and the first lens LNS1 in FIG. 1. The blur detection sensor in the camera body CMR2 outputs a hand vibration angular velocity, while the lens LNS1 requires a hand vibration angular displacement since it controls the displacement of the image blur correction lens L2. Therefore, the camera microcomputer CCPU2 connects the switch SWC2 to the integrator INT side to output an angular displacement $\theta_D$ obtained by integrating the hand vibration angular velocity $\omega_D$. upon switching of the switch SWC2, the camera body CMR2 having the angular velocimeter GR can obtain an angular displacement output as in the camera body CMR1 having the angular displacement meter SA, and does not disturb the image blur correction of the lens LNS1.

Figure 5:
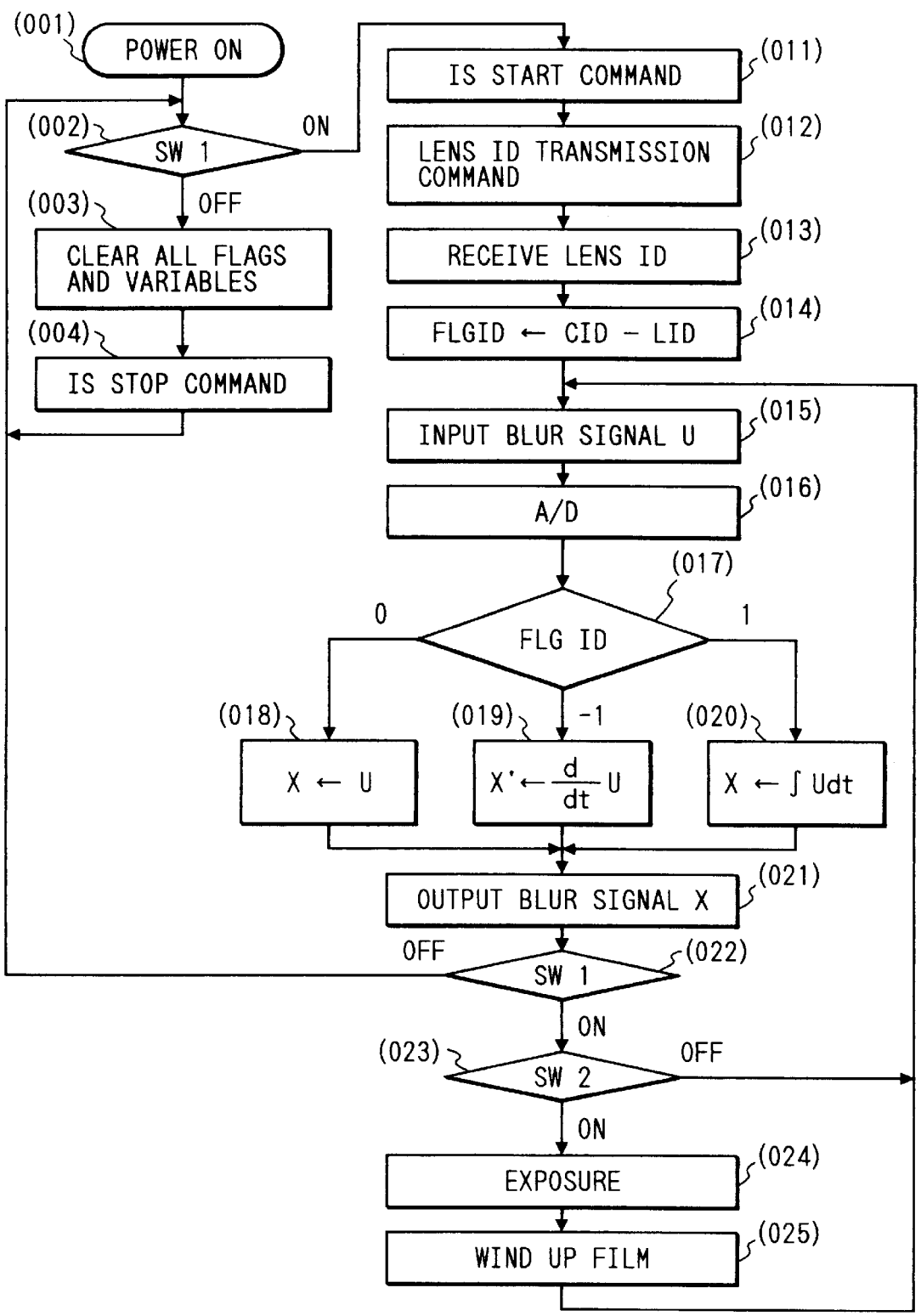
FIG. 5 is a control flow chart of the camera according to the first embodiment of the present invention.
Figure 6:
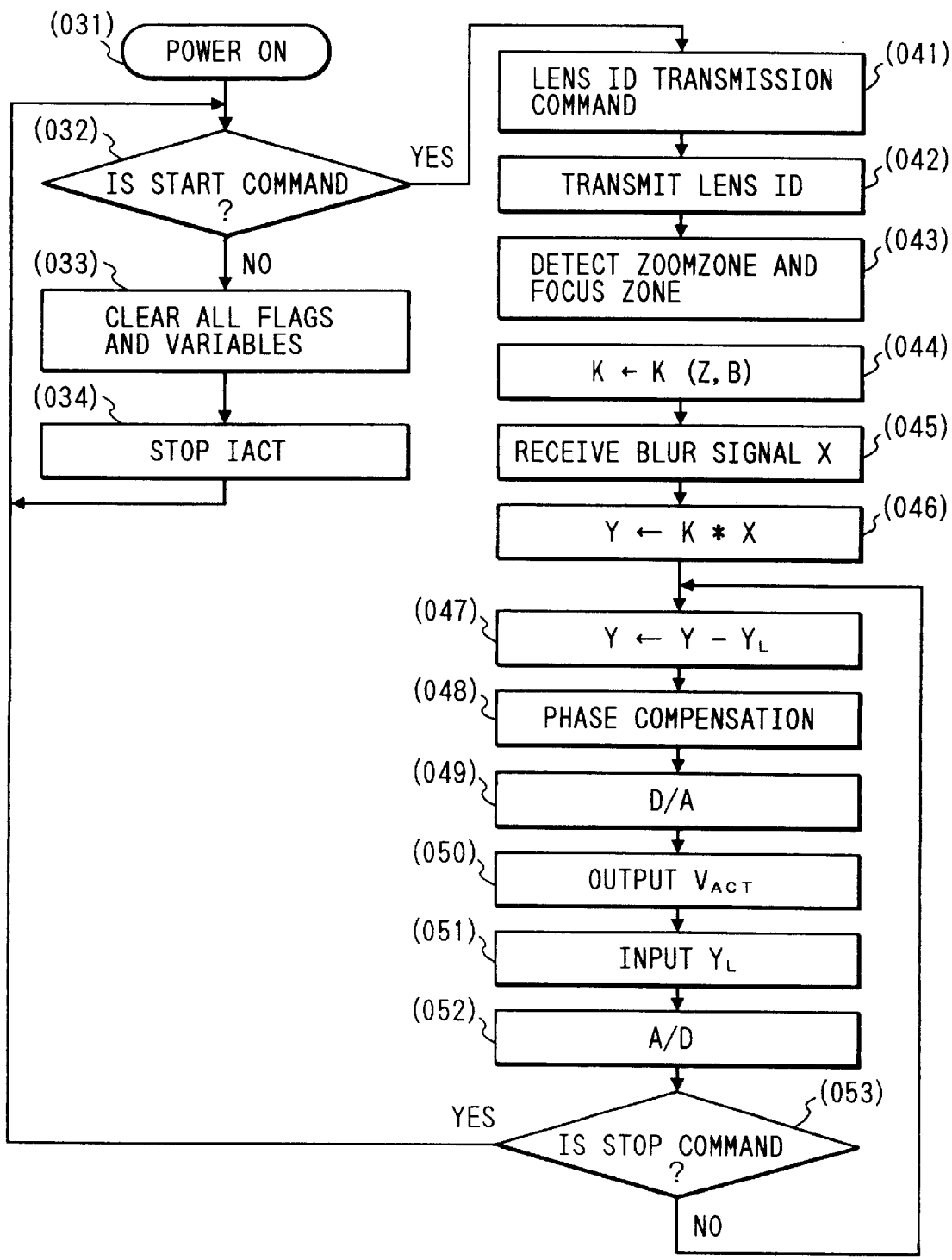
FIG. 6 is a control flow chart of the lens according to the first embodiment of the present invention.

FIGS. 5 and 6 are control flow charts of the microcomputers in the camera and the exchangeable lens of the first embodiment. Since the microcomputers CCPU1 and CCPU2 perform substantially the same operations except for the differential/integral operation steps, and can be explained with reference to an identical flow, they will be described together with reference to FIG. 5.

When the power switch (not shown) of the camera main body CMR is turned on, the camera microcomputer CCPU begins to receive a power supply, and starts an operation from step (002) via step (001).

In step (002), the state of the switch SW1, which is turned on upon depression of the release button to the first stroke position, is detected. If the switch SW1 is OFF, the flow advances to step (003), and all control flags and variables set in a RAM in the camera microcomputer CCPU are cleared and initialized. Thereafter, the flow advances to step (004).

In step (004), a command for stopping an image blur correction operation (IS) is transmitted to the lens LNS side.

Steps (002) to (004) are repetitively executed until the switch SW1 is turned on or until the power switch is turned off.

When the switch SW1 is turned on, the flow jumps from step (002) to step (011).

In step (011), the camera microcomputer CCPU transmits an image blur correction (to be abbreviated as "IS" hereinafter) start command to the lens microcomputer LCPU via the line DCL.

In step (012), the camera microcomputer CCPU transmits a lens ID transmission command via the line DCL. Note that the lens ID is an ID representing whether the image blur correction lens control circuit of the lens LNS uses a displacement control method or a velocity control method. The ID of the lens LNS1 in FIG. 1 is defined by LID=1, and the ID of the lens LNS2 in FIG. 2 is defined by LID=2.

In step (013), the camera microcomputer CCPU receives the lens ID via the line DLC.

In step (014), the camera microcomputer CCPU stores the difference between a camera ID (CID) and the lens ID (LID) in a flag FLGID. Note that the camera ID is an ID representing whether the blur detection sensor of the camera body CMR is an angular displacement meter or an angular velocimeter. The ID of the camera body CMR1 in FIG. 1 is defined by CID=1, and the ID of the camera CMR2 in FIG. 2 is defined by CID=2.

In step (015), a blur signal U is input. Note that the blur signal U corresponds to the hand vibration angular displacement $\theta_A$ in the case of the camera main body CMR1, and corresponds to the hand vibration angular velocity $\omega_A$ in the case of the camera body CMR2.

In step (016), the blur signal is A/D-converted.

In step (017), it is checked if the flag FLGID calculated in step (014) is 0, 1, or −1. FLGID=0 is obtained when CID=LID=1 or CID=LID=2, and corresponds to the combination shown in FIG. 1 or 2. In this case, the flow advances to step (018) to store the blur signal U in a register X, and the blur signal U is output to the lens microcomputer LCPU via the line DCL2 in step (021).

On the other hand, FLGID=−1 is obtained when CID=1 and LID=2, i.e., corresponds to the combination shown in FIG. 3. In this case, the flow advances to step (019). In step (019), the blur signal U is differentiated and the differentiated value is stored in the register X. The stored value is output to the lens in step (021).

In addition, FLGID=1 is obtained when CID=2 and LID=1, i.e., corresponds to the combination shown in FIG. 4. In this case, the flow advances to step (020). In step (020), the blur signal U is integrated and the integrated value Is stored in the register X. The stored value is output to the lens in step (021).

In step (022), the state of the switch SW1 is checked. If the switch SW1 is OFF, the flow returns to step (002) to stop the input, calculation, and output operations of the blur signal. On the other hand, if the switch SW1 is ON, the flow advances to step (023).

In step (023), the state of the switch SW2 is checked. If the switch SW2 is ON, exposure control onto the film is performed in step (024), and a film wind-up operation is performed in step (025). On the other hand, if the switch SW2 is OFF, the flow returns to step (015) to repetitively perform the input, differential/integral calculation, and output operations of the blur signal.

FIG. 6 shows the flow of the lens microcomputers LCPU1 and LCPU2. Since the microcomputers LCPU1 and LCPU2 perform substantially the same operations except that a signal to be controlled by the microcomputer LCPU1 represents the displacement of the lens L2, and a signal to be controlled by the microcomputer LCPU2 represents the velocity of the lens L2, and can be explained with reference to an identical flow, they will be described together with reference to FIG. 6.

Referring to FIG. 6, when the power switch of the camera is turned on, a power supply voltage is also supplied to the lens side, and the flow advances from step (031) to step (032).

In step (032), it is checked if an IS start command is received. If NO in step (032), all flags and variables in the lens microcomputer LCPU are cleared in step (033).

In step (034), the driving operation of the image blur correction actuator IACT is stopped to fix the image blur correction lens L2 at the origin position.

When an IS start command is received from the camera microcomputer CCPU during execution of steps (032) to (034), the flow jumps from step (032) to (041).

In step (041), a lens ID transmission command is received from the camera body CMR. In step (042), the lens ID is transmitted to the camera side in response to the command. Note that steps (041) and (042) correspond to steps (012) and (013) in the flow of the camera side shown in FIG. 5.

In step (043), the zoom zone Z and the focus zone B are detected using the zoom encoder ENCZ and the focus encoder ENCB.

In step (044), the matrix data K(Z, B) of the image blur prevention sensitivity is read out from the ROM table in the lens microcomputer LCPU, and is stored in a register K.

In step (045), a blur signal X is received from the camera. This step corresponds to step (020) in FIG. 5.

In step (046), a lens control signal Y is calculated using the blur signal X and the image blur prevention sensitivity K. Note that the signal Y corresponds to the displacement $d_D$ for driving the image blur correction lens L2 in the case of the lens LNS1, and corresponds to the driving velocity $v_d$ in the case of the lens LNS2.

In step (047), a feedback signal $Y_L$ from the detector DETD or DETV is subtracted from the lens control signal Y. This calculation corresponds to an operation of the addition point P1 or P2.

In step (048), a phase compensation calculation is performed.

The calculation result is D/A-converted in step (049), and is output as a control signal $V_{ACT}$ to the actuator IACT in step (050). Then, the actuator IACT drives the image blur correction lens L2.

In step (051), a feedback signal $Y_L$ corresponding to the moving displacement $d_{LA}$ or the moving velocity $v_{LA}$ of the image blur correction lens is input from the detector DETD or DETV, which detects the moving state of the lens. In step (052), the input signal is A/D-converted.

In step (053), it is checked if an IS stop command is received from the camera body CMR. If NO in step (053), the flow returns to step (047) to subtract the A/D-converted feedback signal $Y_L$.

With the above-mentioned flow, the lens controls the displacement or velocity of the image blur correction lens L2 in accordance with the blur signal X from the camera.

FIG. 7 is a table which summarizes the conversion results of the blur signal by the camera microcomputer CCPU in four different combinations of the camera bodies CMR1 and CMR2, and the exchangeable lenses LNS1 and LNS2.

Second Embodiment

In the first embodiment, differential/integral means of a hand vibration signal is arranged in the camera, and the camera discriminates its own ID and the ID of an exchangeable lens attached thereto, thus selectively using the differential/integral means. However, the camera microcomputer must perform not only the blur signal calculation but also calculations for AF, AE, and the like. In this case, the camera microcomputer CCPU time-divisionally and alternately performs the blur signal calculation and the AF/AE calculations. However, since the blur signal calculation requires continuity as compared to the AF/AE calculations, the AF/AE calculations are frequently interrupted, and the response time of the AF/AE control may deteriorate. On the other hand, since the principal job of the lens microcomputer LCPU is driving control of the image blur correction lens, the microcomputer LCPU need only perform the image blur correction. Therefore, the differential/integral calculation accounting for a large proportion of the calculation load is preferably performed in the lens side to achieve a good system balance.

FIGS. 8 to 14 show an embodiment in which the differential/integral calculation function of a blur signal is provided to the lens side.

Figure 8:
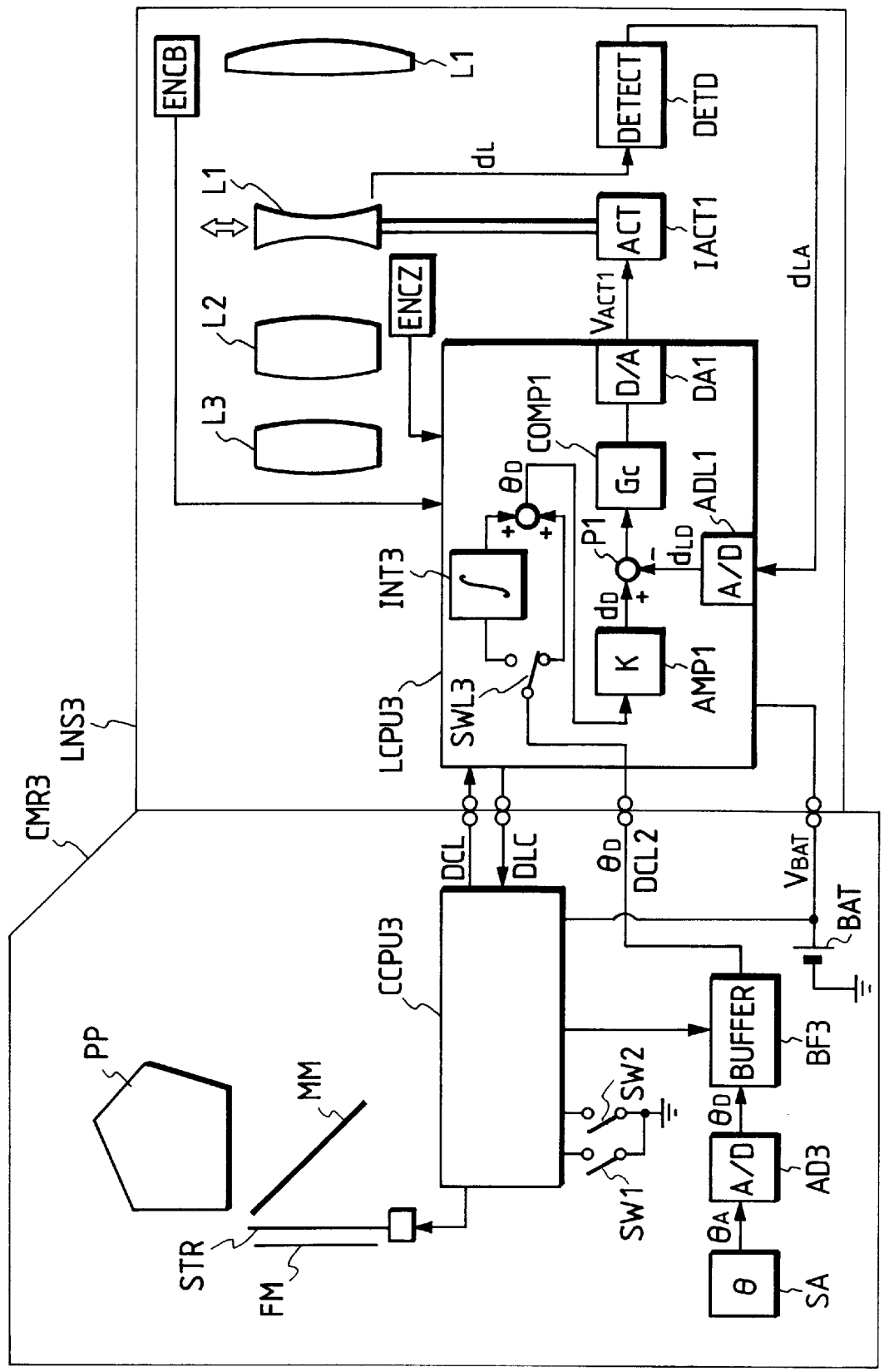
FIG. 8 is a diagram showing a control system of a camera and a lens according to the second embodiment of the present invention.

FIG. 8 shows a system which combines a third camera body CMR3 and a third exchangeable lens LNS3 in the second embodiment of the present invention. Referring to FIG. 8, the camera body CMR3 uses the angular displacement meter SA as a blur detection sensor as in the camera body CMR1 in the first embodiment. However, a camera microcomputer CCPU3 does not include any differentiator. A hand vibration angular displacement signal $\theta_A$ from the angular displacement meter SA is converted into digital data by an A/D converter AD3, and the digital data is transmitted from the line DCL2 to the lens via a communication buffer BF3.

On the other hand, the lens LNS3 has a control circuit for controlling the displacement of the image blur correction lens L2 as in the lens LNS1 of the first embodiment, and a lens microcomputer LCPU3 has a switch SWL3 and an integrator INT3. More specifically, the difference from the first embodiment shown in FIG. 1 is that the switch SWC1 and the differentiator DEF in the camera microcomputer CCPU1 are replaced by the switch SWL3 and the integrator INT3 in the lens microcomputer LCPU3 in FIG. 8. In FIG. 8, since the camera body CMR3 outputs a hand vibration angular displacement signal $\theta_D$, the switch SWL3 in the lens microcomputer is connected to the lower contact, and the angular displacement signal $\theta_D$ is directly input to an amplifier AMP1. Thereafter, the same feedback control as in the lens LNS1 in the first embodiment is executed.

Figure 9:
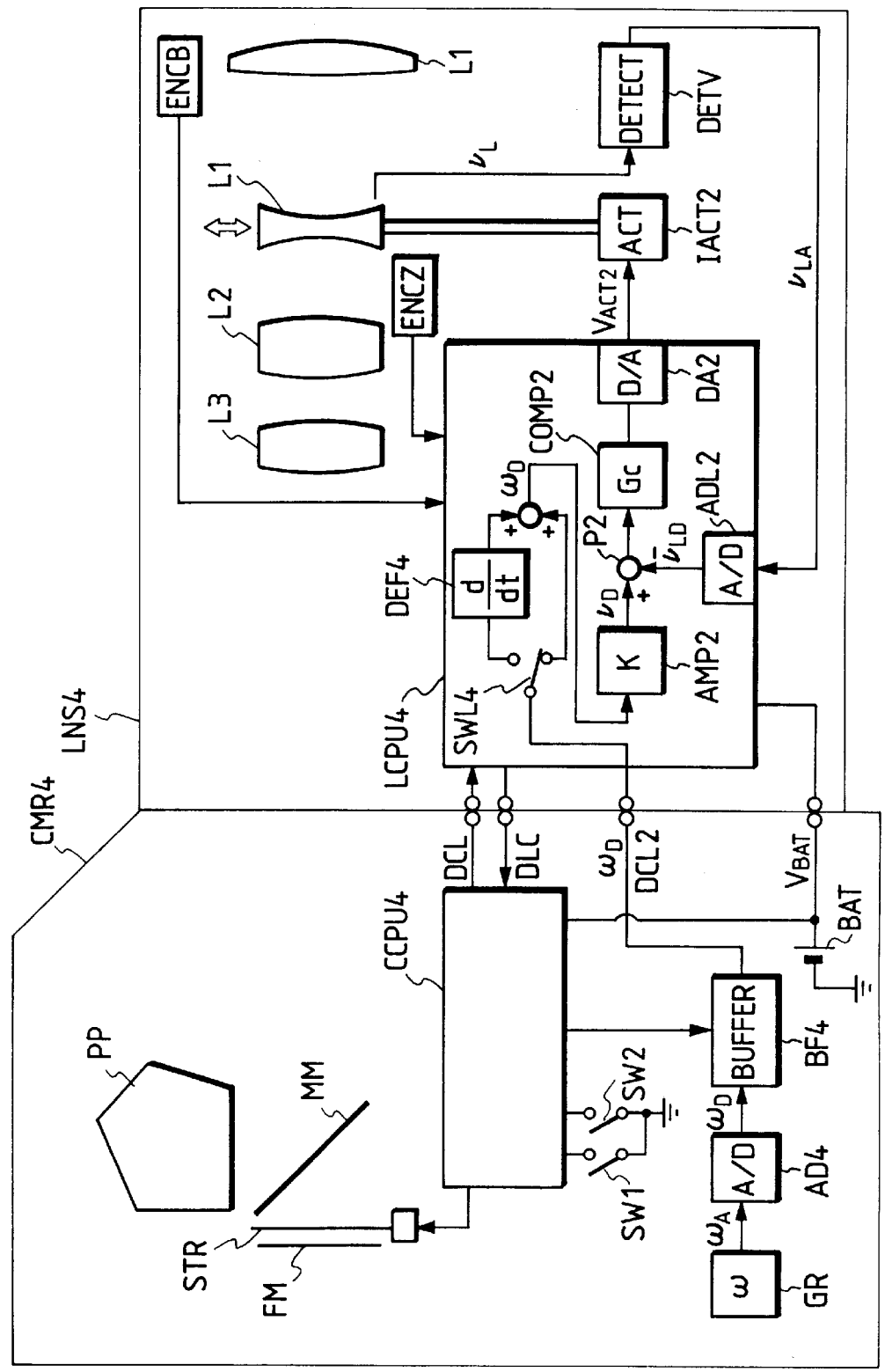
FIG. 9 is a diagram showing a control system of a camera and a lens, which is different from that shown in FIG. 8, according to the second embodiment of the present invention.

FIG. 9 shows a combination of a fourth camera body CMR4 and a fourth exchangeable lens LNS4 in the second embodiment, and corresponds to FIG. 2 in the first embodiment. More specifically, the camera body CMR4 has the angular velocimeter GR as a blur detection sensor as in the camera body CMR2 in the first embodiment, and outputs a hand vibration angular velocity signal $\omega_D$ from the line DCL2 to the lens via an A/D converter AD4 and a communication buffer BF4.

On the other hand, the lens LNS4 has a control circuit for controlling the velocity of the image blur correction lens L2 as in the lens LNS2 in the first embodiment, and a lens microcomputer LCPU4 has a switch SWL4 and a differentiator DEF4. In FIG. 9, since the camera body CMR4 outputs a hand vibration angular velocity signal $\omega_D$, the switch SWL4 in the lens microcomputer LCPU4 is connected to the lower contact, and the angular velocity signal $\omega_D$ is directly input to an amplifier AMP2. Thereafter, the same feedback control as in the lens LNS2 in the first embodiment is performed.

Figure 10:
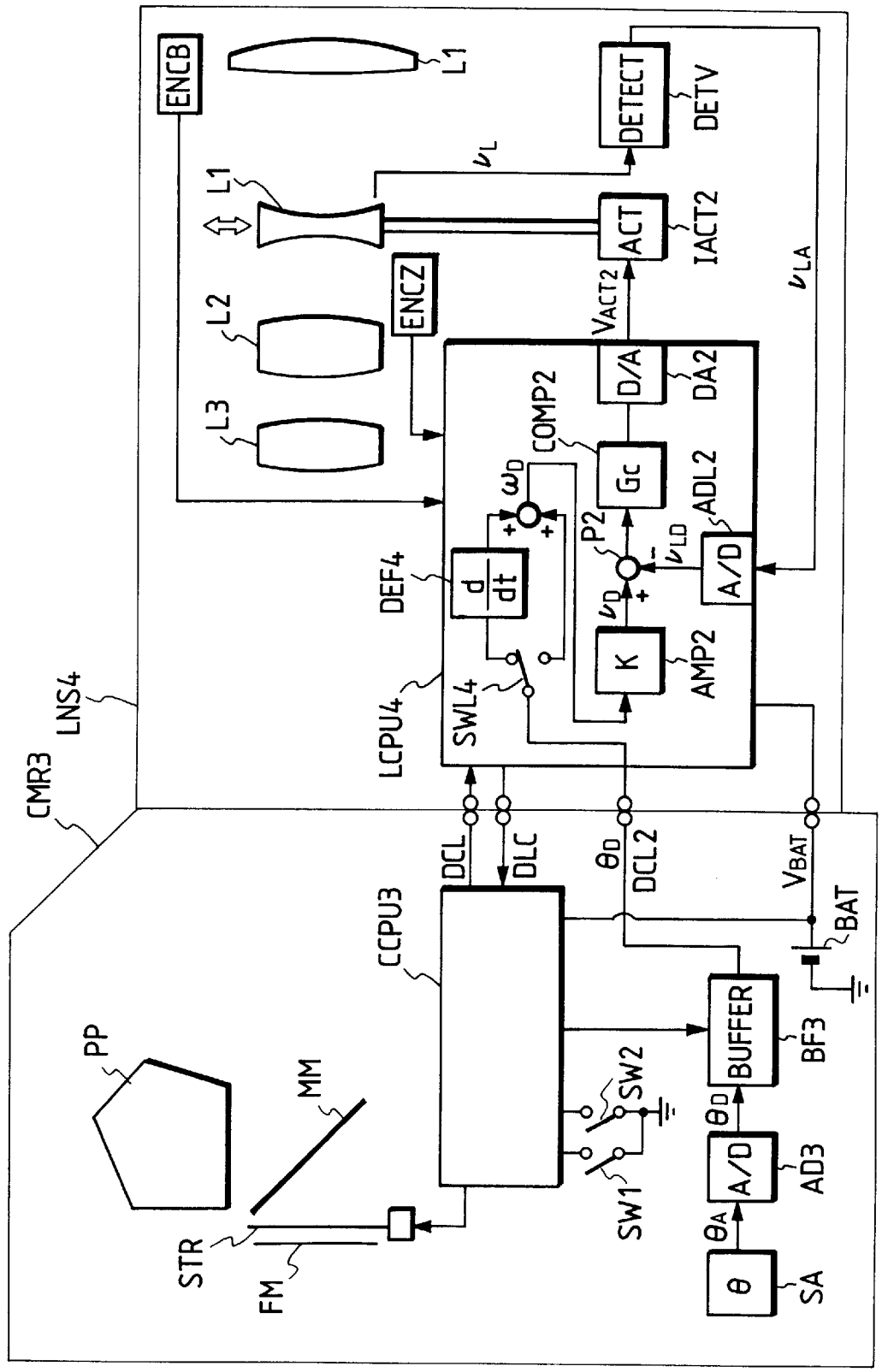
FIG. 10 is a diagram showing a control system of a camera and a lens, which is different from that shown in FIG. 8, according to the second embodiment of the present invention.

FIG. 10 shows a combination of the third camera body CMR3 and the fourth lens LNS4, and corresponds to FIG. 3 in the first embodiment. In this combination, the hand vibration angular displacement $\theta_D$ output from the camera body CMR3 is differentiated by the differentiator DEF4 in the lens microcomputer LCPU4 to be converted into a hand vibration angular velocity $\omega_D$, and the velocity $\omega_D$ is input to the amplifier AMP2. The velocity of the image blur correction lens L2 is controlled in accordance with a velocity signal $v_D$, thus performing image blur correction.

Figure 11:
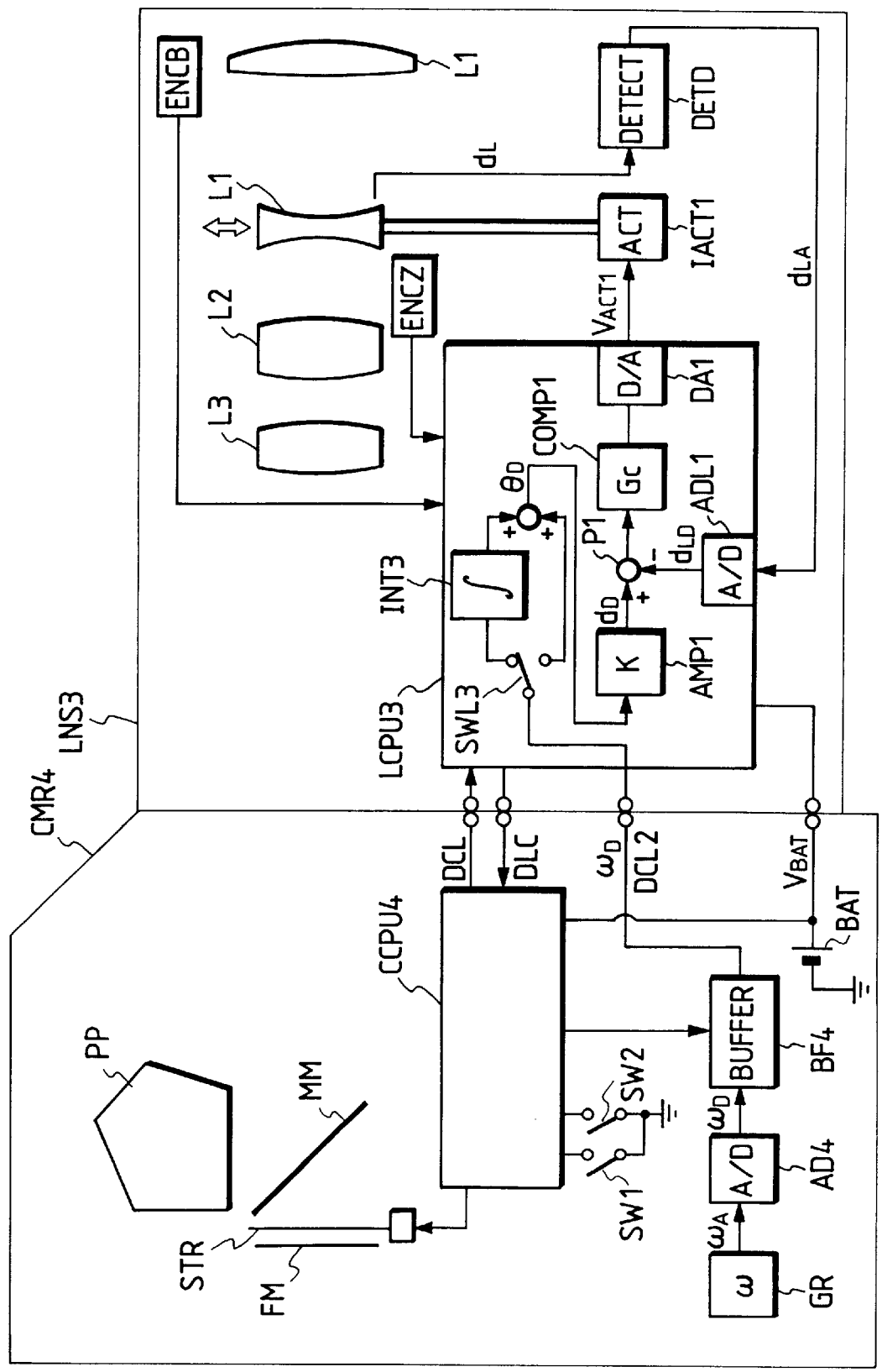
FIG. 11 is a diagram showing a control system of a camera and a lens, which is different from that shown in FIG. 8, according to the second embodiment of the present invention.

FIG. 11 shows a combination of the fourth camera body CMR4 and the third lens LNS3, and corresponds to FIG. 4 in the first embodiment. In this combination, the hand vibration angular velocity $\omega_D$ output from the camera body CMR4 is integrated by the integrator INT3 in the lens microcomputer CCPU3 to be converted into a hand vibration angular displacement $\theta_D$, which is input to the amplifier AMP1. The displacement of the image blur correction lens L2 is controlled in accordance with a displacement signal $d_D$, thus performing image blur correction.

That is, in the second embodiment, the lens side appropriately differentiates or integrates the received hand vibration signal to obtain a signal with an attribute suitable for the control of the image blur correction lens.

Figure 12:
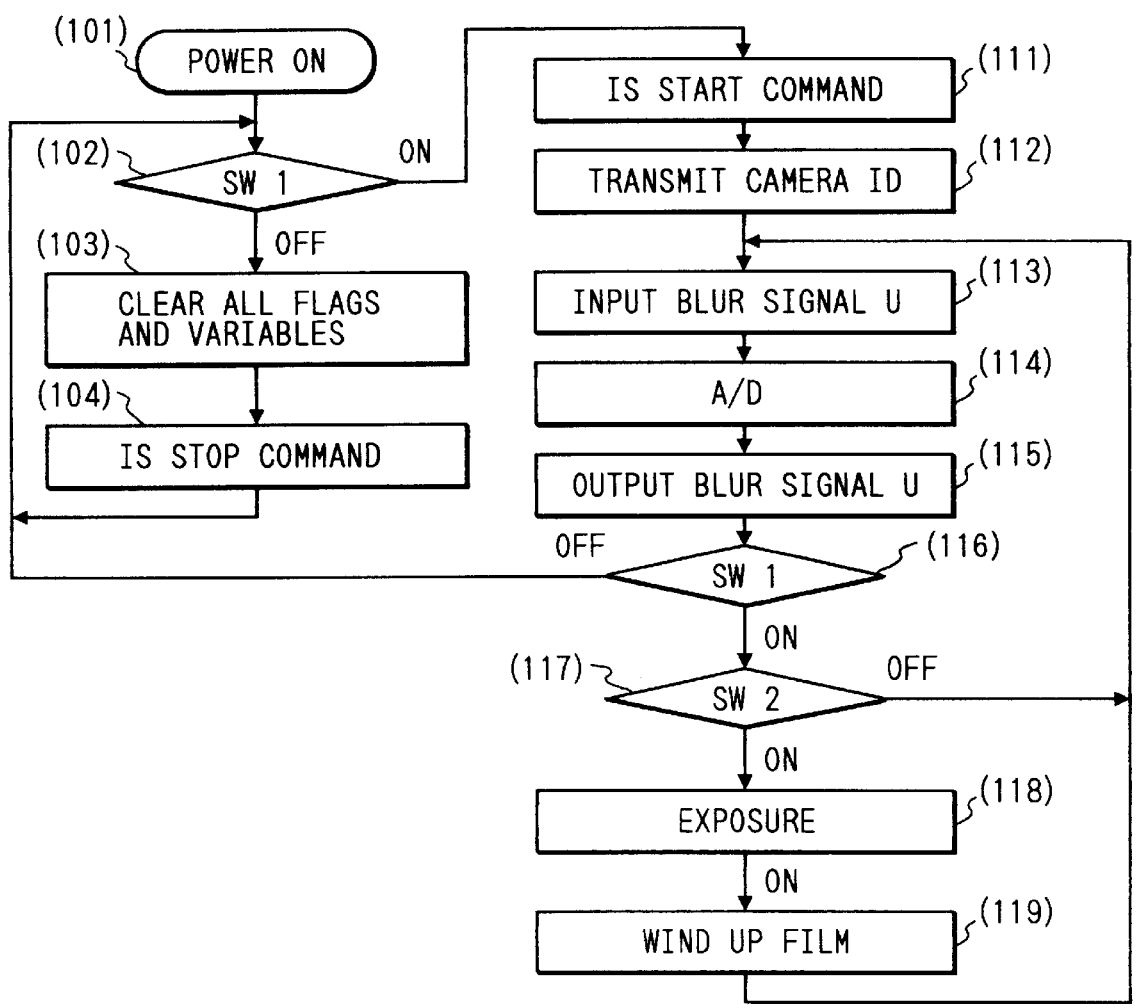
FIG. 12 is a control flow chart of the camera according to the second embodiment of the present invention.
Figure 13:
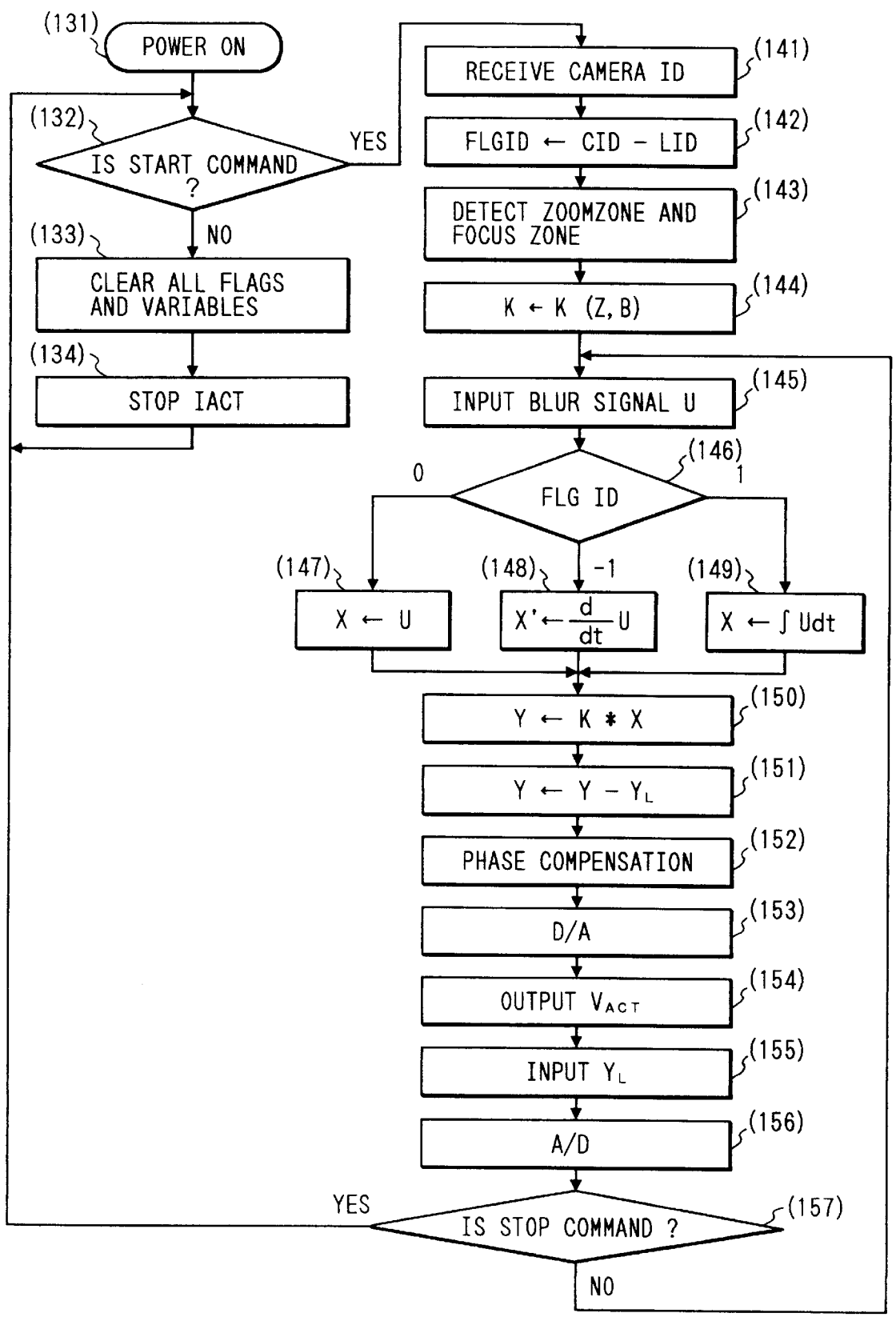
FIG. 13 is a control flow chart of the lens according to the second embodiment of the present invention.

FIGS. 12 and 13 are control flow charts of the microcomputers in the camera bodies and exchangeable lenses in the second embodiment. The flow of the camera microcomputers CCPU3 and CCPU4 will be described below with reference to FIG. 12.

When the power switch (not shown) of the camera body CMR is turned on, the camera microcomputer CCPU begins to receive a power supply voltage, and starts an operation from step (102) via step (101).

In step (102), the state of the switch SW1, which is turned on upon depression of the release button to the first stroke position, is detected. If the switch SW1 is OFF, the flow advances to step (103), and all control flags and variables set in a RAM in the camera microcomputer CCPU are cleared and initialized. Thereafter, the flow advances to step (104).

In step (104), a command for stopping an image blur correction operation (IS) is transmitted to the lens LNS side.

Steps (102) to (104) above are repetitively executed until the switch SW1 is turned on or until the power switch is turned off.

When the switch SW1 is turned on, the flow jumps from step (102) to step (111).

In step (111), the camera microcomputer CCPU transmits an image blur correction (to be abbreviated as "IS" hereinafter) start command to the lens microcomputer LCPU via the line DCL.

In step (112), the camera microcomputer also transmits a camera ID (CID) via the line DCL. Note that the camera ID is an ID representing the attribute of a blur signal to be output from the camera via the line DCL2. The camera body CMR3 which outputs a hand vibration angular displacement is defined by CID=3, and the camera body CMR4 which outputs a hand vibration angular velocity is defined by CID=4.

In step (113), a blur signal U is input. Note that the blur signal U corresponds to the hand vibration angular displacement $\theta_A$ in the case of the camera body CMR3, and corresponds to the hand vibration angular velocity $\omega_A$ in the case of the camera body CMR4.

The blur signal U is A/D-converted in step (114), and the A/D-converted blur signal is output to the lens in step (115).

In step (116), the state of the switch SW1 is checked. If the switch SW1 is OFF, the flow returns to step (102) to stop the input, calculation, and output operations of the blur signal. However, if the switch SW1 is ON, the flow advances to step (117).

In step (117), the state of the switch SW2 is checked. If the switch SW2 is ON, exposure control onto a film is performed in step (118), and a film wind-up operation is performed in step (119). However, if the switch SW2 is OFF, the flow returns to step (113) to repetitively perform the input operation of the blur signal, and the output operation of the A/D-converted blur signal.

FIG. 13 shows the flow for the lens microcomputers LCPU3 and LCPU4. Since the microcomputers LCPU3 and LCPU4 perform substantially the same operations except that a signal to be controlled by the microcomputer LCPU3 represents the displacement of the lens L2, and a signal to be controlled by the microcomputer LCPU4 represents the velocity of the lens L2, and can be explained with reference to an identical flow, they will be described together with reference to FIG. 13.

Referring to FIG. 13, when the power switch of the camera side is turned on, a power supply voltage is also supplied to the lens side, and the flow advances from step (131) to step (132).

In step (132), it is checked if an IS start command is received. If NO in step (132), all flags and variables in the lens microcomputer LCPU are cleared in step (133).

In step (134), the driving operation of the image blur correction actuator IACT is stopped to fix the image blur correction lens L2 at the origin position.

When an IS start command is received from the camera microcomputer CCPU during execution of steps (132) to (134), the flow jumps from step (132) to step (141).

In step (141), the camera ID (CID) is received from the camera body CMR. Note that the camera ID is an ID representing whether the blur detection sensor of the camera body CMR is an angular displacement meter or an angular velocimeter. The ID of the camera body CMR3 in FIG. 8 is defined by CID=3, and the ID of the camera body CMR4 in FIG. 9 is defined by CID=4.

In step (142), the lens microcomputer stores the difference between the camera ID (CID) and a lens ID (LID) in a flag FLGID.

Note that the lens ID is an ID representing whether the image blur correction lens control circuit of the lens LNS uses a displacement control method or a velocity control method. The ID of the lens LNS3 in FIG. 8 is defined by LID=3, and the ID of the lens LNS4 in FIG. 9 is defined by LID=4.

In step (143), a zoom zone Z and a focus zone B are detected by the zoom encoder ENCZ and the focus encoder ENCB, respectively.

In step (144), matrix data K(Z, B) of the image blur prevention sensitivity is read out from the ROM table in the lens microcomputer LCPU, and is stored in a register K.

In step (145), a blur signal U is received from the camera, and this step corresponds to step (115) in FIG. 12.

In step (146), it is checked if the flag FLGID calculated in step (142) is 0, 1, or −1. Note that FLGID=0 is obtained when CID=LID=3 or CID=LID=4, and corresponds to the combination shown in FIG. 8 or 9. In this case, the flow advances to step (147) to store the blur signal U in a register X, and the flow then advances to step (150).

On the other hand, FLGID=−1 is obtained when CID=3 and LID=4, i.e., corresponds to the combination shown in FIG. 10. In this case, the flow advances to step (148) to differentiate the blur signal U, and thereafter, the flow advances to step (150).

In addition, FLGID=1 is obtained when CID=4 and LID=3, i.e., corresponds to the combination shown in FIG. 11. In this case, the flow advances to step (149) to integrate the blur signal U, and thereafter, the flow advances to step (150).

In step (150), a lens control signal Y is calculated using the blur signal X and the image blur prevention sensitivity K. Note that the signal Y corresponds to the displacement $d_D$ for driving the image blur correction lens L2 in the case of the lens LNS3, and corresponds to the driving velocity $v_d$ in the case of the lens LNS4.

In step (151), a feedback signal $Y_L$ from the detector DETD or DETV is subtracted from the lens control signal Y. This calculation corresponds to the operation of the addition point P1 or P2.

In step (152), a phase compensation calculation is performed.

The calculation result is D/A-converted in step (153), and the D/A-converted value is output as a control signal $V_{ACT}$ to the actuator ZACT in step (154). Then, the actuator IACT drives the image blur correction lens L2.

In step (155), a feedback signal $Y_L$ corresponding to the moving displacement $d_{LA}$ or the moving velocity $v_{LA}$ of the image blur correction lens is input from the detector DETD or DETV, which detects the moving state of the lens. In step (156), the signal $Y_L$ is A/D-converted.

In step (157), it is checked if an IS stop command is received from the camera body CMR. If NO in step (157), the flow returns to step (145). The signal $Y_L$ is utilized in the subtraction in step (151).

With the above-mentioned flow, the lens differentiates or integrates a blur signal U from the camera as needed, and controls the displacement or velocity of the correction lens L2.

FIG. 14 is a table which summarizes the conversion results of the blur signal by the lens microcomputer CCPU in four different combinations of the camera bodies CMR3 and CMR4, and the exchangeable lenses LNS3 and LNS4.

Third Embodiment

The first and second embodiments have exemplified a system which has both a plurality of types of camera bodies and a plurality of types of exchangeable lenses.

Since various types of blur detection sensors are available, as described above, it is disadvantageous for the future of the system to limit the sensor, which can be used in the camera system, to one type. on the other hand, even when the image blur correction lens control method is limited to one method, e.g., a displacement control method, this does not result in a serious problem. Therefore, the third embodiment shown in FIGS. 15 to 18 to be described below is an embodiment of a camera system which has a plurality of types of camera bodies, and an exchangeable lens using only one control method.

Figure 15:
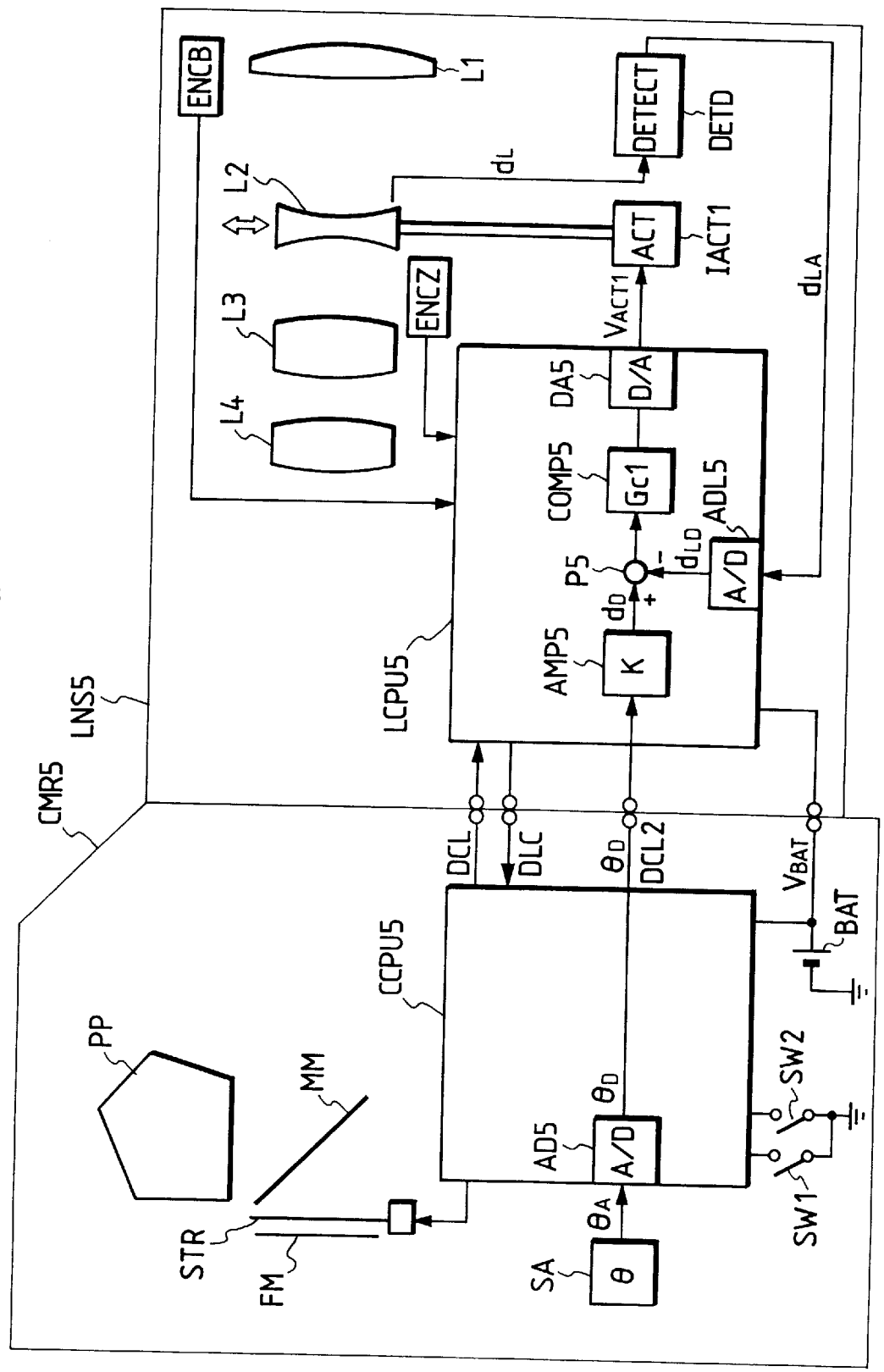
FIG. 15 is a diagram showing a control system of a camera and a lens according to the third embodiment of the present invention.

FIG. 15 shows a system which combines a fifth camera body CMR5 and a fifth exchangeable lens LNS5 in the third embodiment of the present invention. Referring to FIG. 15, the camera body CMR5 has an angular displacement meter SA as a blur detection sensor, and the angular displacement meter SA outputs a hand vibration angular displacement $\theta_A$. A camera microcomputer CCPU5 converts the output $\theta_A$ into digital data using an A/D converter AD5, and outputs the converted value $\theta_D$ to the lens via the line DCL2.

The lens LNS5 has a circuit for controlling the displacement of the image blur correction lens L2 as in the lens LNS1 in the first embodiment, and a lens microcomputer LCPU5 receives the hand vibration angular displacement $\theta_D$ to control the displacement of the lens L2.

Figure 16:
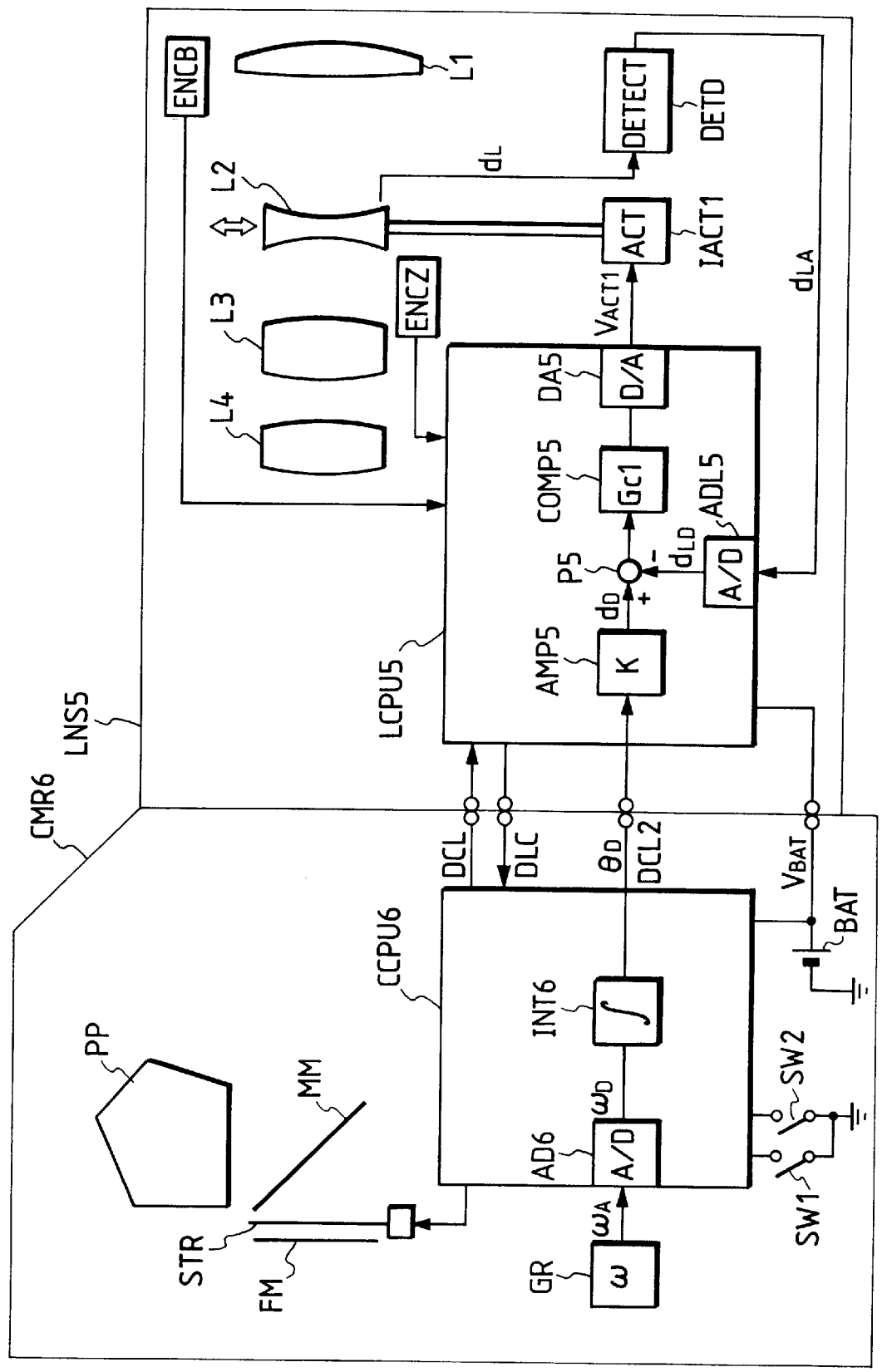
FIG. 16 is a diagram showing a control system of a camera and a lens, which is different from that shown in FIG. 15, according to the third embodiment of the present invention.

FIG. 16 shows a combination of a sixth camera body CMR6 and the fifth lens LNS5. The camera body CMR6 has an angular velocimeter GR as a blur detection sensor to obtain an angular velocity $\omega_A$. A camera microcomputer CCPU6 converts the angular velocity $\omega_A$ into digital data using an A/D converter AD6, then integrates the converted value into a hand vibration angular displacement $\theta_D$ using an integrator INT6, and outputs the angular displacement $\theta_D$ to the lens. The lens LNS5 controls the image blur correction lens L2 as in FIG. 15

Figure 17:
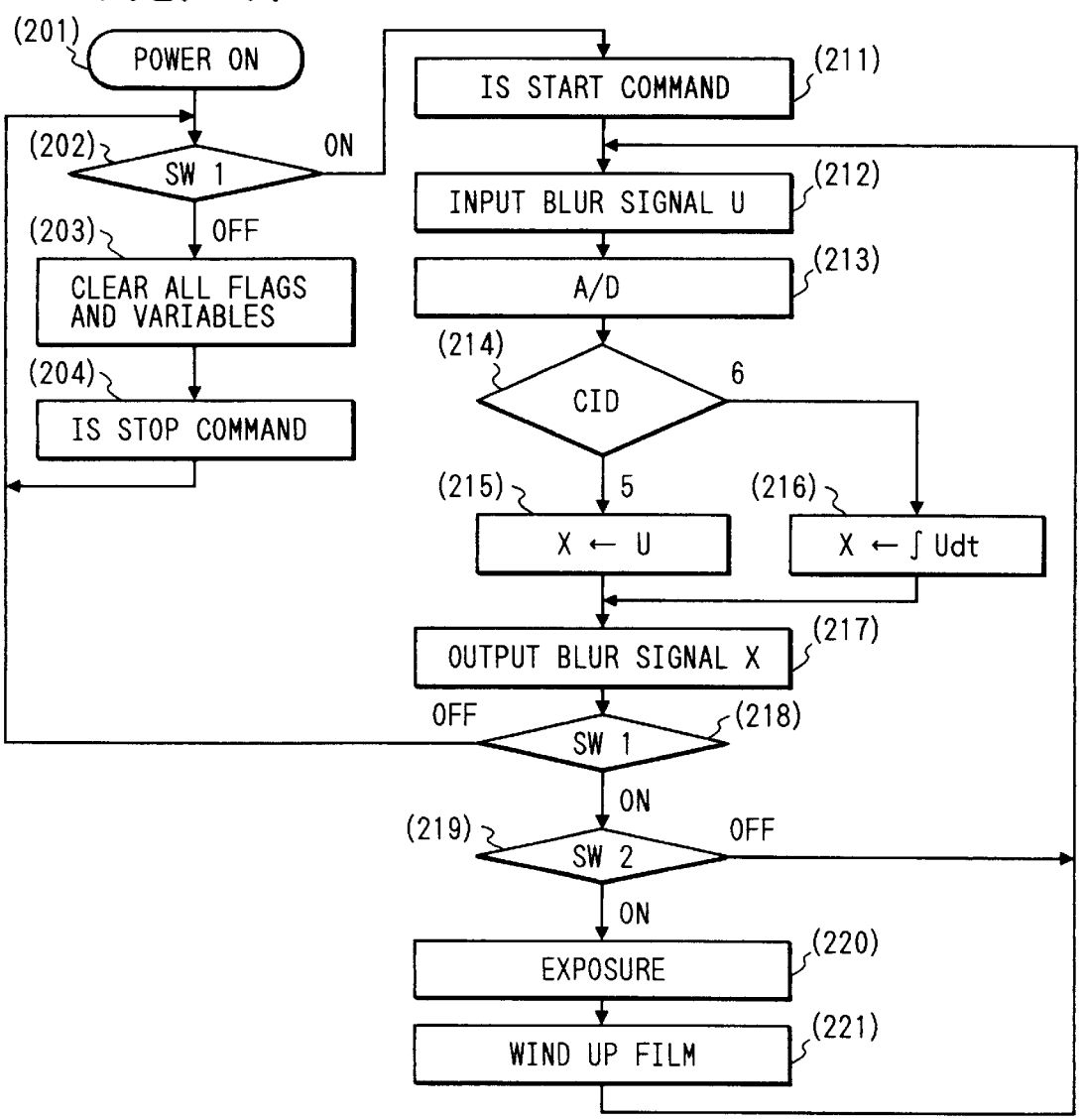
FIG. 17 is a control flow chart of the camera according to the third embodiment of the present invention.

FIG. 17 is a control flow chart of the camera bodies CMR5 and CMR6 in the third embodiment. Steps (201) to (204) are the same as steps (001) to (004) in FIG. 5 of the first embodiment, and a detailed description thereof will be omitted.

In step (211), an IS start command is transmitted to the lens.

In step (212), a blur signal U is input. Note that the blur signal U corresponds to the hand vibration angular displacement $\theta_A$ in the case of the camera body CMR5, and corresponds to the hand vibration angular velocity $\omega_A$ in the case of the camera body CMR6.

In step (213), the blur signal U is A/D-converted.

In step (214), the camera ID, i.e., CID is checked. Note that the camera body CMR5 is defined by CID=5, and the camera body CMR6 is defined by CID=6. Thus, if CID=5, the blur signal U is directly stored in a register X in step (215); if CID=6, the integrated result of the blur signal U is stored in the register X in step (216).

Since steps (217) to (221) are the same as steps (021) to (025) in FIG. 5, a detailed description thereof will be omitted.

Figure 18:
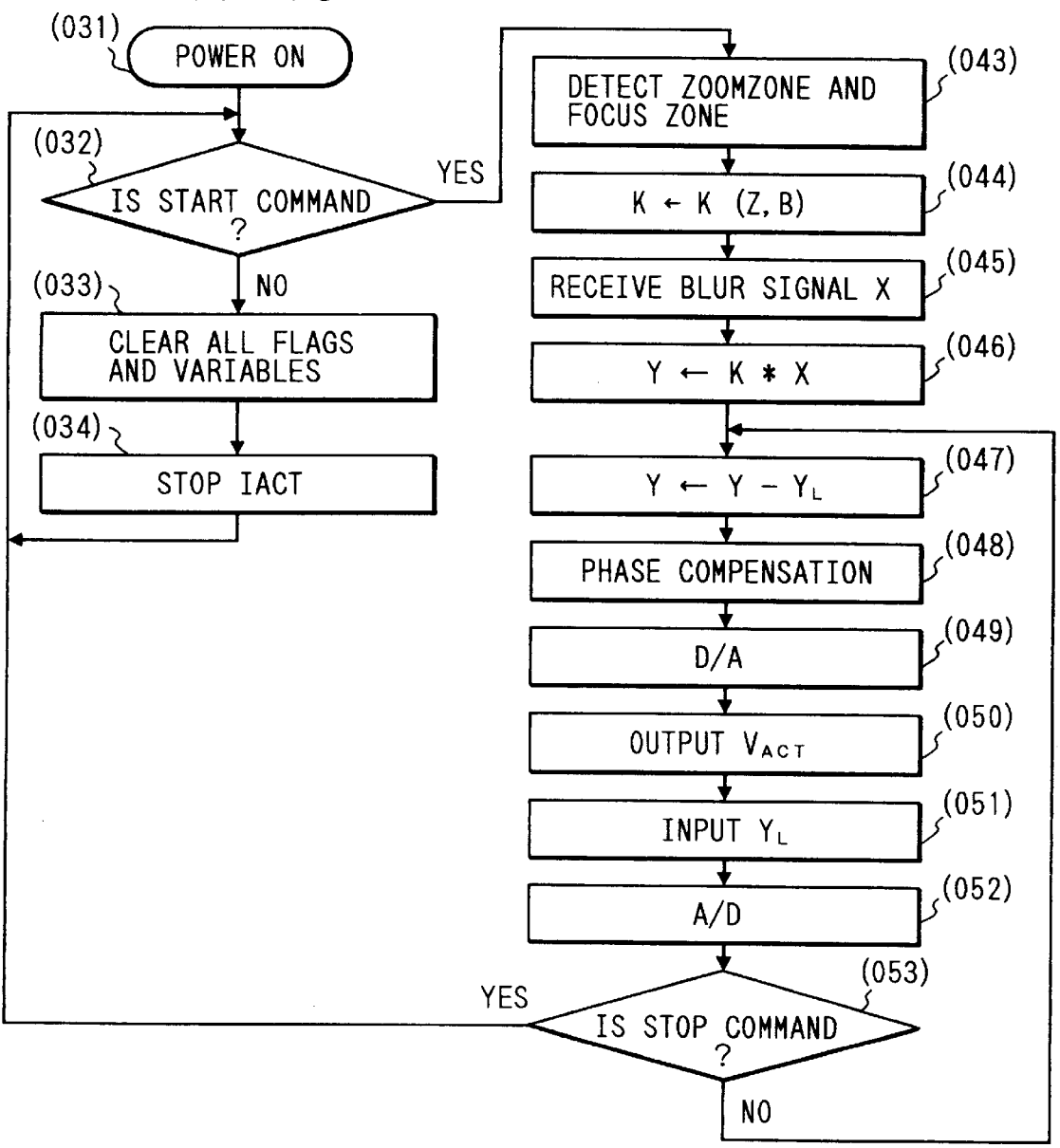
FIG. 18 is a control flow chart of the lens according to the third embodiment of the present invention.

FIG. 18 is a control flow chart of the lens LNS5. Since this flow is substantially the same as that shown in FIG. 6 of the first embodiment, except that steps (041) and (042) are omitted, a description thereof will be omitted.

The flows shown in FIGS. 17 and 18 are substantially the same as those in FIGS. 5 and 6 of the first embodiment, except that the communication steps of the lens ID are omitted. More specifically, since the lens is limited to one type, the lens ID need not be exchanged.

In FIG. 17, discrimination step (214) is provided for the purpose of explaining the flows of both the camera bodies CMR5 and CMR6. However, if these camera bodies have independent flows, the discrimination step (214) is not necessary in the flow of each camera body, as a matter of course.

Another Embodiment

In the first to third embodiments, both the camera and lens process the displacement or velocity of a blur. However, the present invention can be similarly applied to a case wherein the camera and lens process the acceleration of a blur.

The differential/integral calculation may be achieved using an analog calculation circuit using operational amplifiers in place of the digital calculation by the microcomputer.

In each of the first to third embodiments, a lens which moves in a plane substantially perpendicular to the optical axis is used as the image blur correction means. For example, another image blur correction means such as a variable apical angle prism may be used.

The present invention is not limited to the single-lens reflex camera but may also be applied to a lens integrated camera, and the like.

Furthermore, the present invention is not limited to a silver chloride camera, but may also be applied to another image pickup device such as a video camera, other optical equipments, and the like.

The same applies to an apparatus which comprises the image blur correction means in an adapter device for connecting the lens and the camera.

Furthermore, the image blur correction means may be provided to the lens, the blur detection means may be provided to the camera, and means for converting an output from the blur detection means in the camera may be arranged in an adapter for connecting the lens and the camera.

The apparatus may have at least two different types of image blur detection means (for example, one is an acceleration sensor and the other is a velocity sensor), and control means (which performs velocity control in this case) for controlling a driving operation of image blur prevention means may select one of the two image blur detection means. In addition, conversion means (having an integral function) for converting an output from the detection means may be arranged, and the conversion state of the conversion means may be switched in correspondence with the selected detection means so that the output from the selected detection means matches the control characteristic of the control means (when the acceleration sensor is selected, an integral calculation is performed; when the velocity sensor is selected, the output from the detection means is directly output without performing the integral calculation).

The above embodiments or their technical components may be combined as needed.

As described above, according to each of the above-mentioned embodiments of the present invention, upon formation of an image blur correction system by attaching an apparatus having image blur detection means and an apparatus having image blur correction means to each other, even when the characteristic of the image blur detection means does not match that of the image blur correction means, the image blur correction system can be operated, and the degree of freedom as to the type of image blur detection means and the control method of the image blur correction means can be increased, thus satisfying requirements in both the compatibility and expandability of the system in the future.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image blur correction apparatus connectable to each of (i) a camera body of a first camera body type carrying a first image blur detection sensor, which outputs a first blur signal having a first attribute, and (ii) a camera body of a second camera body type carrying a second image blur detection sensor, which outputs a second image blur signal having a second attribute different from the first attribute, said apparatus comprising:

an image blur correction unit, which performs an image blur correction operation based on a driving signal having an attribute that corresponds to the first attribute of the first blur signal;

receiving means, which receives a blur signal from a camera body connected to said apparatus;

a conversion circuit, which converts the second attribute of a second blur signal received by said receiving means to a signal having a corresponding attribute that corresponds to the first attribute of the first blur signal, when the apparatus is connected to a camera body of the second camera body type; and a producing circuit, which produces a driving signal based on the signal converted by said conversion circuit when said apparatus is connected to a camera body of the second camera body type, and produces a driving signal based on a first blur signal received by said receiving means without use of said conversion means when said apparatus is connected to a camera body of the first camera body type, wherein each of the first and second attributes, which are different from each other, includes one of an acceleration attribute, a velocity attribute, and a displacement attribute.

2. Apparatus according to claim 1, further comprising determination means, which determines a type of the connected camera body, and wherein said conversion circuit converts the second attribute of the second blur signal received by said receiving means to the signal having the corresponding attribute that corresponds to the first attribute of the first blur signal when said determination means determines that the apparatus is connected to a camera body of the second camera body type.

3. Apparatus according to claim 1, wherein said conversion circuit comprises a differential circuit.

4. Apparatus according to claim 1, wherein said conversion circuit comprises an integrating circuit.

5. Apparatus according to claim 1, wherein the first attribute corresponds to an attribute of speed, and wherein the second attribute corresponds to an attribute of displacement.

6. Apparatus according to claim 1, wherein the first attribute corresponds to an attribute of displacement, and wherein the second attribute corresponds to an attribute of speed.

7. A camera body connectable to (i) an image blur correction unit of a first image blur correction unit type performing a first image blur correction operation based on a first blur signal having a first attribute, and (ii) an image blur correction unit of a second image blur correction unit type performing a second image blur correction operation based on a second blur signal having a second attribute different from the first attribute of the first blur signal, said camera body comprising:

a blur detection sensor, which outputs a blur detection signal having the first attribute of the first blur signal;

a determination circuit, which determines a type of image blur correction unit connected to said camera body;

a conversion circuit, which converts the blur detection signal output by said blur detection sensor into a signal having a corresponding attribute that corresponds to the second attribute of the second blur signal, when said determination circuit determines that the camera body is connected to an image blur correction unit of the second image blur correction unit type; and transmission means, which (i) transmits the signal converted by said conversion circuit to an image blur correction unit connected to said camera body when said determination circuit determines that the image blur correction unit connected to said camera body is of the second image blur correction unit type, and (ii) transmits the blur detection signal output by said blur detection sensor to the blur correction unit connected to said camera body without use of said conversion circuit when said determination circuit determines that the image blur correction unit connected to said camera body is of the first image blur correction unit type, wherein each of the first and second attributes, which are different from each other, includes one of an acceleration attribute, a velocity attribute, and a displacement attribute.

8. A camera body according to claim 7, wherein said conversion circuit comprises a differential circuit.

9. A camera body according to claim 7, wherein said conversion circuit comprises an integrating circuit.

10. A camera body according to claim 7, wherein the blur detection signal output by said blur detection sensor has an attribute of speed, and wherein the second attribute corresponds to an attribute of displacement.

11. A camera body according to claim 7, wherein the blur detection signal output by said blur detection sensor has an attribute of displacement, and wherein the second attribute corresponds to an attribute of speed.

* * * * *

UNITED STATES PATENT AND TRADEMARK OFFICE
CERTIFICATE OF CORRECTION

PATENT NO. : 6,392,696 B1
DATED : May 21, 2002
INVENTOR(S) : Ichiro Onuki

It is certified that error appears in the above-identified patent and that said Letters Patent is hereby corrected as shown below:

Column 1,
Line 15, "equipments," should read -- equipment, --.

Column 5,
Line 60, "DETV." should read -- DETV --.

Column 6,
Line 29, "upon" should read -- Upon --.

Column 7,
Line 36, "Is" should read -- is --.

Column 12,
Line 43, "on" should read -- On --.

Signed and Sealed this

Twenty-third Day of July, 2002

Attest:

*Attesting Officer*

JAMES E. ROGAN
*Director of the United States Patent and Trademark Office*